Nov. 27, 1945.  J. L. ANDERSON  2,389,585
PLATE CUTTING OR WELDING MACHINE
Filed Feb. 24, 1943
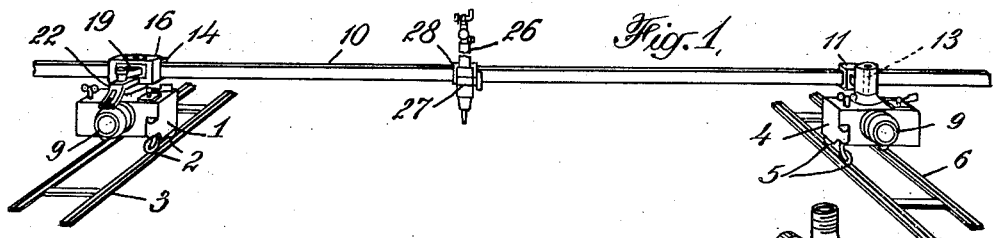
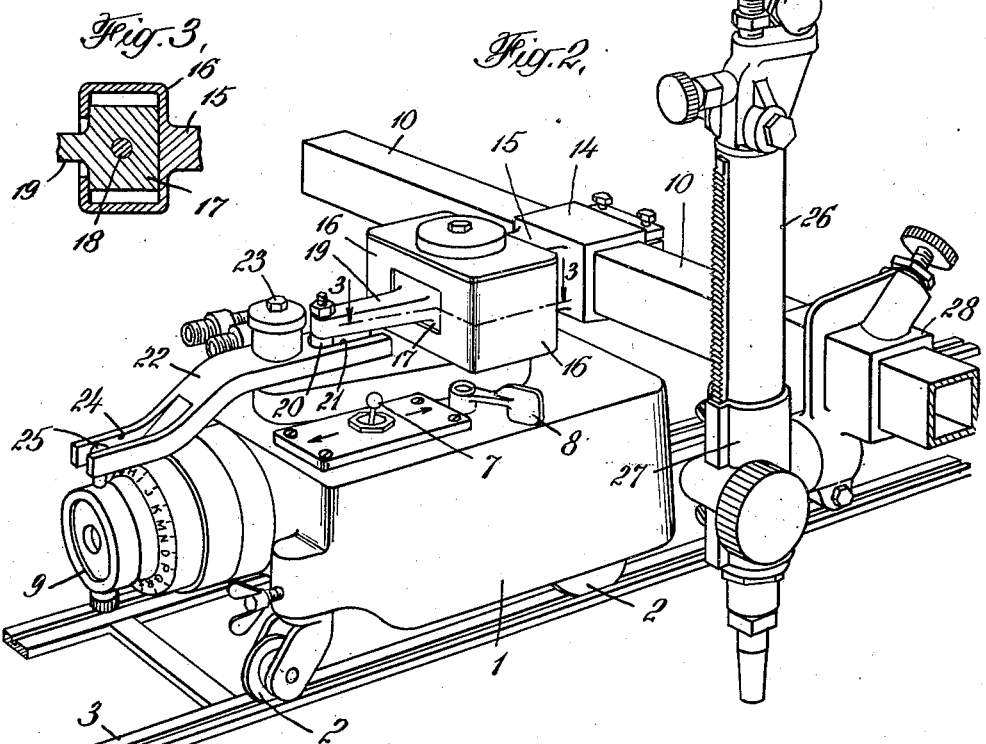
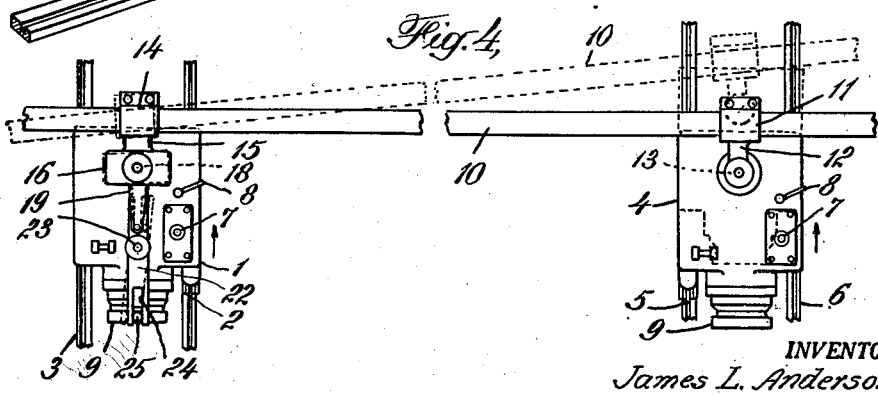
INVENTOR.
James L. Anderson
BY
ATTORNEYS Patented Nov. 27, 1945

2,389,585

UNITED STATES PATENT OFFICE 2,389,585

PLATE CUTTING OR WELDING MACHINE

James L. Anderson, Closter, N. J., assignor to Air Reduction Company, Incorporated, a corporation of New York Application February 24, 1943, Serial No. 476,929

5 Claims. (Cl. 266—23)

This invention relates to apparatus for cutting or welding plates by means of oxyacetylene torches or other high temperature cutting or welding instrumentalities. More particularly it relates to improvements in the means employed for supporting and translating the cutting or welding instrumentalities over the work-piece.

In oxyacetylene plate cutting or welding apparatus it is common practice to support one or more torches from an arm or bar projecting laterally from a motor-driven carriage adapted to travel along a track, the torch-carrying bar usually being supported by the carriage in cantilever fashion. The cantilever type of support for the torch bar is not satisfactory where the torch is to be positioned some distance to one side of the carriage or where it is desired to support a number of torches at spaced points along the length of the bar, or in any other instance where the bar would be called upon to support too much weight at one side of the carriage, unless in such cases the bar is counterweighted at the other side of the carriage, and even then the apparatus is likely to lack lateral stability.

In accordance with this invention the torch supporting bar is carried by two carriages adapted to travel on parallel tracks, the torch bar extending transversely of the tracks and being supported at opposite ends by the carriages. In this way a relatively long torch bar may be employed and the torch may be positioned wherever desired along the bar, or a number of torches may be supported by the bar and spaced along the length thereof, or arranged in any other desired way, without affecting the stability of the apparatus. Since each carriage is driven by its own motor independently of the other carriage, the above described arrangement, without some provision for automatically causing the carriages to travel at substantially the same speed, would not be practical because the two carriages are not likely to be propelled by their separate motors at the same speed. It would be difficult to accomplish this by individual manual adjustment of the governors during the cutting operation. According to this invention each end of the torch bar has a swivel connection to the corresponding carriage, such that if one carriage should travel faster or slower than the other and move the carriages out of transverse alignment the bar is canted and the change in its angularity is utilized to change the adjustment of the speed-control governor on one of the carriages until the carriages are again brought into transverse alignment. In this way the carriages are caused to travel at substantially the same speed and are maintained in substantial transverse alignment and the torch bar is maintained at right angles to the path of travel.

One form of apparatus embodying the invention is illustrated in the accompanying drawing in which:

Figure 1 is a perspective view of the apparatus as seen from the rear;

Fig. 2 is a perspective view drawn to a larger scale of one of the carriages and a portion of the torch-supporting bar showing the mechanism carried by this carriage for automatically adjusting the speed-control governor of its motor upon canting of the torch bar when the carriages get out of transverse alignment;

Fig. 3 is a horizontal section taken on the line 3—3 of Fig. 2; and

Fig. 4 is a plan view showing in an exaggerated fashion how the canting of the torch bar when the carriages get out of transverse alignment results in adjustment of the speed-control governor on one of the carriages.

As best shown in Figs. 1 and 4, a carriage 1 provided with traction wheels 2 travels along a suitable track 3. A similar carriage 4 provided with traction wheels 5 travels along a second track 6 positioned parallel with the track 3. The carriages 1 and 4 may be of a well-known type except for the hereinafter described alterations which adapt them for the present purpose. Each carriage is provided with an electric motor (not shown) controlled by a hand operated electric switch 7 (Fig. 2). When the switch lever is in its mid-position the circuit of the electric motor is broken. When the switch lever is moved to its forward position the motor propels the carriage forwardly along its track, and when the switch lever is moved to its rearward position the motor is reversed to cause the carriage to move rearwardly along its track. The lever 8 controls a clutch as is well understood in the art.

Each carriage has a speed-control governor for the motor. The governor may be of the centrifugal type disclosed in the patent to C. T. Evans No. 2,032,743. Since the governor itself forms no part of the present invention it is not shown in the drawing, it being sufficient to understand that the speed at which the governor causes the carriage to move along its track depends upon the adjustment of the knob 9, and that when this knob is turned in an anti-clockwise direction, as viewed in Fig. 2, the speed at which the governor causes the carriage to travel is increased, whereas if the knob is turned in a clockwise direction, as viewed in Fig. 2, such speed is decreased.

A torch bar 10 spans the two carriages 1 and 4 and is supported at or near each of its ends by one of the carriages. The torch bar is connected to the carriage 4 by means of a split clamp 11 having a rearwardly extending arm 12 which is swiveled on a post 13 (Fig. 1) carried by the carriage 4.

The torch bar is connected to the carriage 1 by a similar split clamp 14 but the rearwardly extending arm 15 of this clamp is rigidly connected to a hollow box-like housing 16 (Fig. 2). A block 17 is enclosed by the housing 16 and is swiveled to the carriage by means of a post 18. The block 17 fits rather snugly within the housing 16 except that the housing has a small amount of play on the block transversely of the carriage (see also Fig. 3). The block 17 has a rearwardly extending arm 19 which carries a pin 20. The pin 20 engages in a slot 21 in one end of a lever 22 pivotally mounted on the carriage by means of a pivot pin 23. The other end of the lever 22 is also slotted as shown at 24. A pin 25 on the adjusting knob 9 engages in the slot 24.

Should one of the carriages travel faster or slower than the other so that they move out of transverse alignment, the angularity of the bar 10 with respect to the longitudinal axis of each carriage changes. In other words when the carriages move out of transverse alignment the bar 10 is canted. This action is illustrated in Fig. 4 in exaggerated fashion. In this figure the position of the carriage 4 relative to the carriage 1, should the former travel at greater speed than the latter, is represented by the dot and dash lines. The position to which the bar 10 is then canted is also indicated by dot and dash lines. This swings the clamp 14, the arm 15, housing 16, block 17, and arm 19 about the axis of the pivot pin 18 to the broken line position shown in Fig. 4. The pin 20 at the rear end of the arm 19 swings the lever 22 about its pivot 23 in a direction to cause the governor-adjusting knob 9 to be turned in an anti-clockwise direction and thus propel the carriage 1 at a greater speed than the other carriage until the two carriages are brought back to transverse alignment and the bar 10 is again at right angles to the path of travel. Should the carriage 4 tend to travel slower than the carriage 1 the bar 10 is canted in the opposite direction and the speed of carriage 1 is reduced. Of course in practice only a slight angular displacement of the bar 10 is sufficient to quickly bring about the necessary adjustment of the speed of carriage 1 to restore the carriages to transverse alignment.

The transverse play between the block 17 and its housing 16 allows for the increased distance between the pivot pins 13 and 18 on the carriages when the bar 10 changes its angularity. If desired the housing 16 could be eliminated by pivoting the arm 15 of the clamp 14 on the pin 18 and extending it to the rear of this pin and causing it to actuate the lever 22 in the same manner that the arm 19 actuates it. In this case it would be necessary to allow the bar 10 to slide in at least one of the clamps 11, 14 when the bar cants.

The bar 10 may be utilized to support one or more oxyacetylene cutting torches positioned on the bar in any desired way. Only one of such torches is shown in the drawing at 26. The torch holder 27 is adjustably mounted on the bar 10 by means of a bracket 28. The torch is preferably supported by the bracket so that the torch tip, that is, the operative portion of the torch, lies in substantial alignment with the pivots 13 and 18.

As the bar 10 is moved laterally over the work-piece by the carriages 1 and 4 the work-piece is cut along a single line, if there is one cutting torch supported by the bar, and along a number of parallel lines if a number of cutting torches are supported in spaced relation on the bar.

Instead of attaching cutting torches to the bar 10, the bar may be utilized to support welding torches, or it may support one or more high temperature cutting or welding instrumentalities of some other type, such as the arc type. In fact, the improved supporting and translating apparatus may be utilized in many relations where it is desired that a bar for carrying most any kind of a device be moved laterally over a surface and be supported at opposite ends by individual self-propelled carriages, and where it is important that the carriages travel at substantially the same speed.

I claim:

1. In a plate cutting or welding machine adapted to operate on a pair of parallel tracks including a self-propelled motor-driven carriage adapted to travel on each track, a bar spanning the two carriages and swivelly connected at one end to one of the carriages, an arm swivelly connecting the other end of the bar to the second carriage, a torch carried by said bar for operating on a work piece, an adjustable speed-control governor on the second carriage and means on said second carriage for adjusting the governor; the improvement which comprises a lever pivoted on the second carriage and operatively connected at one end to the governor adjusting means, and means whereby swivelling of said arm upon canting of the bar due to the carriages moving out of transverse alignment swings said lever about its pivot and thereby actuates said governor adjusting means.

2. In a plate cutting or welding machine adapted to operate on a pair of parallel tracks including a self-propelled motor-driven carriage adapted to travel on each track, a bar spanning the two carriages and swivelly connected at one end to one of the carriages, an arm swivelly connecting the other end of the bar to the second carriage, a torch carried by said bar for operating on a work piece, an adjustable speed-control governor on the second carriage and means on said second carriage for adjusting the governor; the improvement which comprises a rotatable knob on the second carriage for adjusting the speed-control governor, a lever pivoted on the second carriage and operatively connected at one end to said knob for turning the same, and means whereby swivelling of said arm upon canting of the bar due to the carriages moving out of transverse alignment swings said lever about its pivot and thereby turns the knob.

3. In a plate cutting or welding machine adapted to operate on a pair of parallel tracks including a self-propelled motor-driven carriage adapted to travel on each track, a bar spanning the two carriages and swivelly connected at one end to one of the carriages, an arm swivelly connecting the other end of the bar to the second carriage, a torch carried by said bar for operating on a work piece, an adjustable speed-control governor on the second carriage and means on said second carriage for adjusting the governor; the improvement which comprises a rotatable knob on the second carriage for adjusting the speed-control governor, and connections between said arm and the knob so constructed and arranged that canting of the bar due to the carriages moving out of transverse alignment turns the knob to adjust the governor.

4. In a plate cutting or welding machine adapted to operate on a pair of parallel tracks including a self-propelled motor-driven carriage adapted to travel on each track, a bar spanning the two carriages and swivelly connected at one end to one of the carriages, an arm swivelly connecting the other end of the bar to the second carriage, a torch carried by said bar for operating on a work piece, an adjustable speed-control governor on the second carriage and means on said second carriage for adjusting the governor; the improvement which comprises means supporting the torch on said bar with the operative portion thereof substantially in transverse alignment with the pivots at which the bar is connected to the carriages, and means operatively connecting said bar to the adjusting means for the speed-control governor to adjust the same to cause the carriages to be brought back into transverse alignment upon canting of the bar due to the carriages moving out of transverse alignment.

5. In a plate cutting or welding machine adapted to operate on a pair of parallel tracks including a self-propelled motor-driven carriage adapted to travel on each track, a bar spanning the two carriages and swivelly connected at one end to one of the carriages, an arm swivelly connecting the other end of the bar to the second carriage, a torch carried by said bar for operating on a work piece, an adjustable speed-control governor on the second carriage and means on said second carriage for adjusting the governor; the improvement in which the bar is swivelly connected to said one of the carriages by means of an arm extending therefrom substantially at right angles thereto, in which the arm swivelly connecting said other end of the bar to the second carriage extends substantially at right angles therefrom, at the same side thereof as said other arm, and in which the arm swivelly connecting said other end of the bar to the second carriage is operatively connected to the speed-control governor and constructed and arranged to adjust said governor to bring the carriages back into transverse alignment upon canting of said bar due to the carriages moving out of transverse alignment.

JAMES L. ANDERSON.